No. 820,556. PATENTED MAY 15, 1906.
G. K. COOKE.
MEASURING FAUCET.
APPLICATION FILED MAR. 26, 1904.
2 SHEETS—SHEET 1.
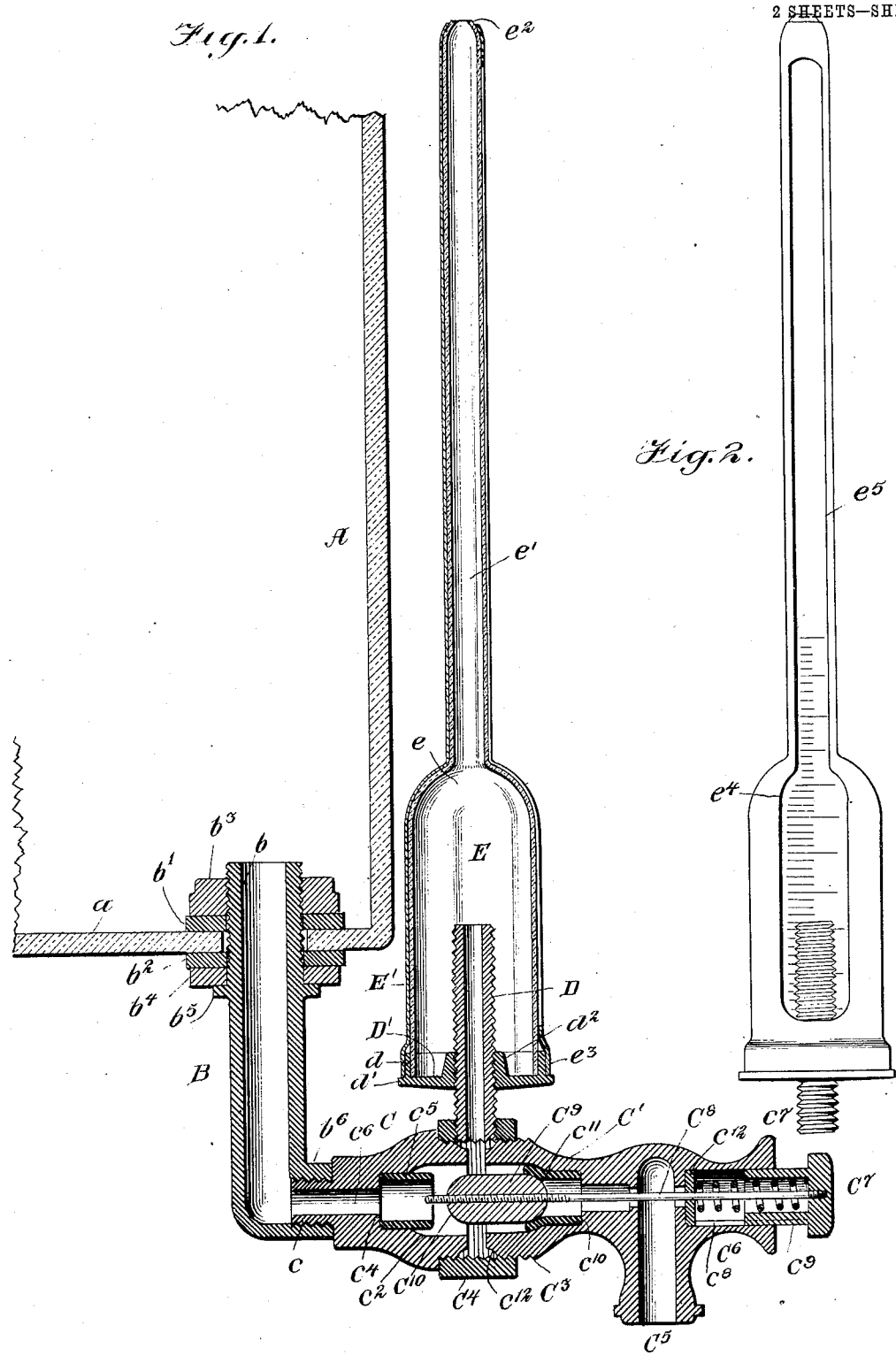

No. 820,556. PATENTED MAY 15, 1906.
G. K. COOKE.
MEASURING FAUCET.
APPLICATION FILED MAR. 26, 1904.
2 SHEETS—SHEET 2.
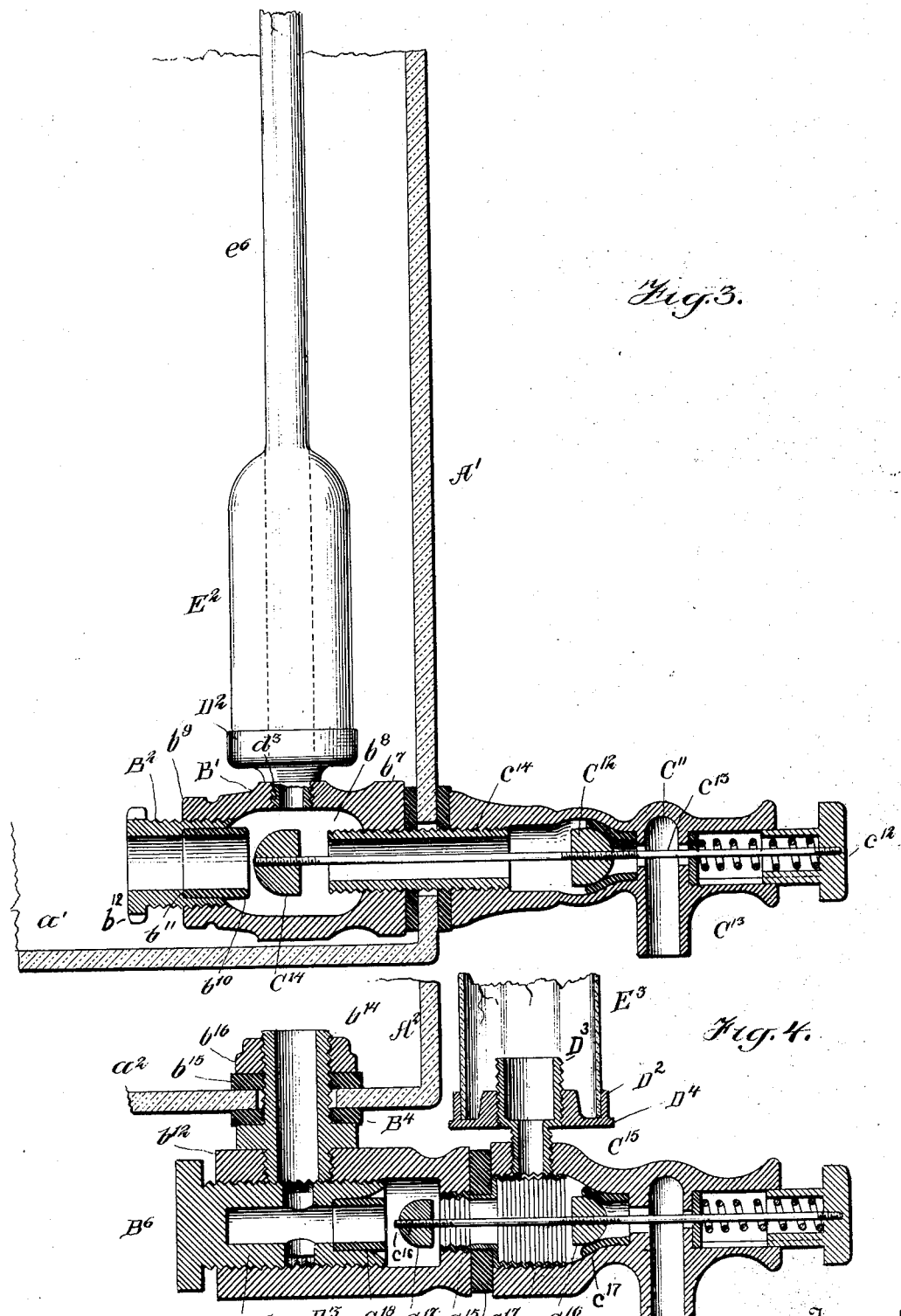

UNITED STATES PATENT OFFICE.

GEORGE KISSAM COOKE, OF JAMAICA, NEW YORK.

MEASURING-FAUCET.

No. 820,556.           Specification of Letters Patent.           Patented May 15, 1906.

Application filed March 26, 1904. Serial No. 200,121.

*To all whom it may concern:*

Be it known that I, GEORGE KISSAM COOKE, a citizen of the United States, residing in Jamaica, in the borough of Queens, city and State of New York, have invented a certain new and useful Improvement in Measuring-Faucets, of which the following is a specification.

This invention relates to a measuring-faucet, and, as set forth herein, is disclosed more particularly in connection with a faucet of the self-closing type. There are certain important features, however, which are capable of employment with other constructions of faucets and, if desired, with suitable forms of valves.

Prominent objects of the invention are the accurate measuring of determined quantities of liquid and dispensing of the same in a simple and convenient manner, facility for adjustably regulating the quantities of liquid measured, efficient liquid-level indication, and air-venting provision, avoidance of objectionable overflow at the measuring-chamber, positive seating of the valve provision, and high efficiency, simplification, and durability of the construction generally.

With the above and other purposes in view the invention comprehends a novel arrangement of faucet or valve and measuring-chamber coactive therewith, the measuring-chamber being in communication with the liquid-supply when said faucet or valve is closed, but adapted to discharge its measured quantity of liquid through the faucet or valve when the latter is opened, together with means for adjustably regulating the quantity of liquid admitted to the measuring-chamber upon each closure of the said faucet or valve.

As previously intimated, the improvement involves other important features which in addition to those alluded to are clearly explained in the subsequent detailed description.

The invention is shown and will be described as adapted for service in connection with a soda-water fountain in dispensing a flavoring-syrup; but it will be understood that the improvements are not restricted to such use.

In the accompanying drawings, forming part of this specification, Figure 1 is a vertical sectional view of a part of a syrup-reservoir equipped with one form of my invention. Fig. 2 is a vertical elevation of the measuring-chamber and certain appurtenances, viewed in a position at a right angle to that in which they appear in the preceding figure. Fig. 3 is a view similar to Fig. 1 and disclosing another form of the invention. Fig. 4 is a detail sectional view illustrating a novel provision for adjusting the valve-seat from the rear.

Similar reference characters are employed to designate corresponding parts in the several figures of the drawings wherein they occur.

Referring more particularly to Figs. 1 and 2, the bottom $a$ of the syrup-reservoir, immediately adjacent to the front wall A of the latter, contains a circular opening sufficiently ample to admit of the ready insertion therethrough and securement therein of the externally-threaded end portion $b$ of an elbow B by nuts and yielding washers in the usual manner, the whole serving to provide a firm liquid-tight joint.

If desired, certain parts of the novel measuring-faucet may be of some suitable nonmetallic material. Hence the elbow B, nut $b^3$, and washer $b^4$ can be of hard rubber, while the washers $b'$ $b^2$ can be of moderately soft rubber.

The lower forward part $b^6$ of the elbow B is internally threaded for the engagement within the same of the exteriorly-threaded stem $c$, carried by and horizontally projecting from the rear of the faucet-body.

The faucet-body comprises a rear section C and forward section C', relatively independent and which have enlarged contiguous portions $C^2$ $C^3$ externally threaded for mutual engagement by an annular coupling $C^4$, said portions being interiorly formed to present, in conjunction with the coupling, an inner recess of a character and capacity sufficient, for purposes to be presently explained.

The body-section C at one end of the recess contains a shoulder $c^4$, against which bears a yielding tubular section, the forward part $c^5$ of which projects within the said recess to form an expansible valve-seat, the opening of which is alined with a horizontal passage $c^6$, rearwardly extending through the section and the stem $c$ thereof, communication being thus established between the faucet-chamber and the interior of the syrup-reservoir.

Integrally presented by the body-section C' is a depending nozzle $C^5$ and forward hollow extension $C^6$, the latter having an externally-flaring extremity $c^7$. The recess within the extension is intersected by a bottom longitudinal groove $c^8$. Snugly, but slidingly, bearing within the extension recess is the hollow shank of a push-button $C^7$, said shank having a lower spline or feather $c^9$ within the groove $c^8$ for preventing the rotation of the push-button, while permitting the free longitudinal movement thereof.

Within a properly-recessed portion of the section $C'$, contiguous at the rear of the nozzle, is a tubular yielding section, the forward end of which bears against a shoulder $c^{10}$, while its rear end $c^{11}$ projects a short distance within the larger recess of the faucet-body to constitute an expansible valve-seat in reversed relation with regard to the seat in the section C.

Secured in the head of the push-button $C^7$ is the forward end of a valve-spindle $C^8$ of comparatively small diameter and of such length that it extends rearward successively through the button-shank, the recess within the extension $C^6$, and through an opening centrally in a washer $c^{12}$, bearing at the inner end of the extension recess, said spindle continuing through the forward wall of the nozzle, across the latter, and through a liberal aperture in the rear wall thereof, through the adjacent tubular section, and finally terminating at a point well within the large recess within the faucet-body.

In threaded engagement with the spindle is a body the respective ends of which are rounded to present primary and secondary valves $C^9$ $C^{10}$ in coactive relation with the valve-seats $c^{11}$ and $c^5$, so that one valve will seat as the other is unseated. The primary valve is normally maintained seated and the valve $C^{10}$ unseated through the medium of a coiled expanding-spring contained within the recess of the extension $C^6$ and also within the hollow shank. Suitable means for guiding the inner end of the spindle and maintaining the alinement of the same may be employed.

With regard to the parts described as being carried by the section $C'$, including the primary valve $C^9$, it may be stated that they embody an arrangement of features somewhat similar to that of the self-closing faucet disclosed in a patent of mine and dated August 1, 1899, No. 630,184, to which patent reference may be had for a complete understanding of the construction and operation thereof.

It will be observed that the enlarged part $C^3$ of the section $C'$ is amply provided in the matter of threads for engagement by the coupling. This admits of a considerable range of adjustment relative to the section C, and thus enables the sections to be nicely adjusted for insuring the accurate liquid-tight seating of the secondary valve and also to permit the adjustable variation of the measuring capacity of the valve-chamber.

The coupling has tapped therein at the upper side thereof an opening which communicates with the interior recess in the valve-body, and in said opening is screwed the lower end of a small vertical tube D, externally threaded throughout its length. Upon this tube is adjustably mounted a base $D'$, having adjacent to its periphery a vertical annular flange $d$, which serves to provide a marginal ledge $d'$. The central portion of the base is somewhat enlarged and has a threaded perforation to adapt it for serving as a nut $d^2$ for engagement with the tube D, in order to provide for the vertical adjustment of the base thereon.

E refers to a somewhat vertically-extended glass chamber approximately cylindrical in configuration and provided at its upper end with a dome-shaped contraction $e$, merging in a vertical tubular extension $e'$ of comparatively restricted diameter and which terminates at its upper extremity in a contracted part $e^2$, containing a perforation. The lower end of the chamber is confined liquid-tight within the base-flange $d$, so that said chamber and its parts will be properly supported in position. Intimately incasing said chamber and its extension $e'$ is a thin metal sheathing $E'$, the lower portion $e^3$ of which is slightly expanded to snugly take over and embrace the flange $d$, and thereby contribute to support the sheathing, as well as the chamber E and its parts.

At its forward side the sheathing $E'$ has a vertically-extended opening $e^4$, appositely located with respect to the chamber E, said opening $e^4$ being intersected at its top by a vertically-elongated slot $e^5$ in corresponding relation to the extension $e'$. The thin metallic sheathing thus described constitutes a guard or shield for protecting the glass chamber and its extension from injury and at the same time presents a medium contributing to support such chamber and said extension in proper position. The opening $e^4$ and slot $e^5$ conjointly provide a sight-opening through which the liquid within the glass chamber and its extension $e'$ can be readily observed. That portion of the glass chamber exposed through the opening $e^4$ may have a series of graduations thereon for indicating various quantities represented by different liquid-levels within said chamber.

It will be readily gathered from the description immediately preceding that the chamber E and its upper extension are designed to form a measuring-chamber. With the parts represented in the position shown in Fig. 1 it will be comprehended that syrup can pass from the reservoir by way of the tube B and flowing past the unseated valve $C^{10}$ will ascend in the tube B and enter the chamber E, the inflow being continued until said chamber is filled and the liquid has attained a height in the extension $e'$ proportionate with the level in the reservoir. As the liquid enters and rises in the measuring-chamber the air within the latter will be displayed and expelled through the opening in the upper end of the extension $e'$, thus furnishing a proper vent for the chamber. The base $D'$ and other parts of the measuring-chamber can have previously been vertically adjusted on the tube D, so as to regulate the quantity of liquid to be measured, which quantity is represented by the amount of liquid within the chamber and its extension $e'$ above the upper end of the tube D plus the liquid in said latter tube and a limited amount contained in the body-recess behind the valve $C^9$. Therefore in providing the measuring-divisions such excess liquid is taken into consideration.

When it is required to draw the quantity of liquid thus measured, pressure is exerted on the push-button, which has the effect of bringing the secondary valve liquid-tight to its seat and unseating the valve $C^9$. By this means communication between the syrup-reservoir and the body-recess and measuring-chamber is absolutely cut off and communication established between the measuring-chamber and the discharge-nozzle. Consequently the measured amount of liquid in the chamber E and its extension $e'$ above the upper end of the tube D will be withdrawn and discharged through the nozzle. Of course pressure on the push-button will be maintained until the measured quantity is exhausted. Upon releasing the button the expanding-spring will operate to restore the valves $C^9 C^{10}$ to their former positions, thereby cutting off communication with the nozzle and permitting a further quantity of the syrup to be measured off in the chamber E, its extension, tube D, and the valve-chamber. The extended character of the upper portion of said measuring-chamber obviously prevents objectionable overflow.

In order to maintain communication between the tube D and interior recess of the faucet-body, notwithstanding the relatively adjustable character of the sections C C' of the latter, the contiguous ends of said sections are provided with external depressions $c^{12}$, thus avoiding angles that would interfere with the unrestricted communication between said tube and the body-recess.

From the description thus far it will be appreciated that a measuring-faucet embodying my improvements can be conveniently and securely connected with a syrup-reservoir, the measured quantities of liquid regulated by the position of the measuring-chamber upon the tube D, and that the predetermined quantity of liquid in the measuring-chamber can be isolated from the liquid in the reservoir and withdrawn in an expeditious manner. The weight of the liquid in the measuring-chamber aids when said liquid is discharged to cause the flow of the liquid from the valve-chamber, and thus efficiently discharge. Furthermore, the condition and quantity of the liquid within the measuring-chamber will at all times be under convenient observation and proper venting of the liquid-chamber afforded.

The parts comprising such measuring-chamber are of such character and relation that they may be easily fitted together and adjusted and can be conditioned to avoid deleteriously affecting the syrup. Additionally, the nature and connection of the portions comprising the measuring-faucet are such as to permit of the ready substitution of repair parts and thorough cleansing, when required, of all portions of the construction.

In Fig. 3 I have illustrated a form of the invention as being applied to a syrup-reservoir, whereby the self-closing faucet proper, $C^{11}$, projects horizontally from the front wall $A'$ of the reservoir immediately contiguous to the bottom $a'$ thereof. In this construction the self-closing faucet while of slightly-modified character still embodies the essential principles of the spring-projected push-button $c^{12}$, slidingly guided at the front end of the faucet and having attached thereto the forward end of the horizontally-extended valve-spindle $c^{13}$, carrying the primary valve $C^{12}$, coacting with a yielding seating for controlling the immediate communication with the nozzle $C^{13}$. The enlarged rear portion of the valve-body carries the externally-threaded tubular stem $c^{14}$, the projecting part of which extends through an opening in the reservoir-wall and engages within the forward part $b^7$ of a casing $B'$ of the character and configuration substantially represented. This casing contains a relatively enlarged interior recess $b^8$, and engaged within a threaded opening in the inner end $b^9$ of the casing is a short inlet-tube $B^2$, one end of which, as will be seen, is in apposition with respect to said casing-recess and is interiorly cut away to permit the expansion of the inner projecting end $b^{10}$ of a tubular flexible valve-seating, the other end of which bears against a shoulder $b^{11}$ interiorly within the tube $B^2$. The external end of the latter has a flange $b^{12}$, to facilitate the rotation of such tube by the fingers.

It will be noted that the valve-spindle $c^{13}$ is of such length that its inner extremity carries a secondary valve $C^{14}$ within the casing-recess $b^8$, the expanding-spring at the forward part of the faucet serving to normally maintain said valve $C^{14}$ in an unseated position relative to the seating $b^{10}$, while the valve $C^{12}$ is in a seated position. It will be comprehended that by revolving the tube $B^2$ to cause it to move inward or outward within the casing $B'$ the position of the valve-seating $b^{10}$ can be altered to insure the accurate liquid-tight seating of the secondary valve. In this construction the measuring-chamber in itself has no adjusting provision, it having a capacity for a definite quantity of liquid and simply comprises a circular base $D^2$, provided with a short threaded nipple $d^3$, engaged within an appropriate opening in the top of the casing, the glass measuring-chamber $E^2$ being connected at its lower end with said base and having the upper prolonged extension $e^6$.

By contracting the measuring-chamber to the limit of the tubular extension, as shown by dotted lines, Fig. 3, and enlarging more or less the capacity of the valve-chamber to suit the desired measure the valve-chamber will subserve the purpose of the measuring-compartment.

The construction disclosed in Fig. 4 illustrates still another arrangement providing for the accurate and intimate seating of the secondary valve. In this said construction the hollow horizontal casing $B^3$ is located below the bottom $a^2$ of the syrup-reservoir adjacent to the front wall $A^3$ thereof, said casing being tapped at its upper side for the engagement of the lower threaded end $b^{12}$ of a flanged nipple $B^4$, the upper threaded portion $b^{14}$ of which extends through an opening in the reservoir-bottom, yielding gaskets $b^{15}$ and an upper nut $b^{16}$ securing a liquid-tight connection for said nipple with the reservoir in an obvious manner.

The body $C^{15}$ of the spring-closed faucet has a rearwardly-extending tubular extension $c^{15}$, which is screw-engaged within an opening therefor in the forward head of the casing $B^3$, a yielding washer $b^{17}$ being interposed between such casing and body $C^{15}$ to promote a tight joint at this point.

Screwed into an opening in the top of the enlarged rear part of the faucet-body is the lower reduced end of a short vertical tube $D^3$, the upper part of which is of enlarged diameter and externally threaded for adjustably mounting thereon the base $D^4$ of the glass measuring-chamber $E^3$. In this construction the measuring-chamber may be restricted to the form of a simple tube and the capacity of the valve-chamber varied to suit requirement.

$C^{16}$ $C^{17}$ are the primary and secondary valves, respectively, both carried by the spindle $c^{16}$, the primary valve being normally held to its yielding seat $c^{17}$, while the latter is in unseated relation with respect to the tubular seat $c^{18}$. This latter is carried in the forward end of the plug $B^5$, longitudinally screw-adjustable in the rear open end of the casing $B^3$. The externally-projecting part of the plug is enlarged and peripherally milled to present a head $B^6$, facilitating the adjustment of the plug by the fingers from a position at the rear. Palpably by manipulating the plug the position of the valve-seat $c^{18}$ can be adjusted to insure the accurate seating of the secondary valve. The plug has a peripheral opening or slot to adapt it for communication with the upper connection irrespective of the plug adjustment.

The advantage of having the tubular yielding section forming the seat of the secondary valve project within the rear portion of the valve-chamber is that a cut-off is established even before the button is pressed to the limit of its inward movement. Thus the objection incident to not pressing the button to its full limit is largely overcome.

I do not limit myself to the particular construction and arrangements of parts shown and described, but reserve the right to all modifications fairly within the scope of my invention.

Having now described my invention, what I claim as new, and desire to secure by Letters Patent, is—

1. In means of the character described, the combination with a dispensing device and a connection, the latter adapted for communication with a liquid-supply, of valve provision coactive both with the said device and the said connection for opening the one and closing the other, a measuring-chamber, said valve provision being located one part on each side of the inlet from the measuring-chamber, and means for normally holding said valve provision closed with respect to the outlet from the device, substantially as described.

2. In means of the character described, the combination with a dispensing device and a connection, the latter adapted for communication with a liquid-supply, of valve provision coactive both with the said device and the said connection for opening the one and closing the other, a tube coöperative with said connection and dispensing device, and a measuring-chamber adjustable on said tube.

3. In means of the character described, the combination with a dispensing device and a connection, both containing valve-seats and the connection adapted for communication with a liquid-supply, of valve provision coactive with both seats for closing one and opening the other, a measuring-chamber common to both seats, and means for adjusting one of said valve-seats, substantially as described.

4. In means of the character described, the combination with a dispensing device and a connection, the latter adapted for communication with a liquid-supply, of suitable valve provision, and a measuring-chamber in coöperative relation with said dispensing device and connection, said measuring-chamber comprising a body portion and elongated transparent extension, the latter of reduced diameter and containing a vent-opening, and means for varying the quantity to be delivered from said measuring-chamber separate from said valve provision.

5. In means of the character described, the combination with a dispensing device and a connection, the latter adapted for communication with a liquid-supply, of suitable valve provision, said valve provision comprising two valves mounted on a stem and means for operating them simultaneously in such a manner as to close one and open the other by moving said stem, a measuring-chamber comprising a glass body and elongated extension, the latter of reduced diameter and containing a vent-opening, and a metal shell incasing said body and extension and providing a sight-opening, and means for varying the quantity to be delivered from said measuring-chamber separate from said valve provision.

6. In means of the character described, the combination with a dispensing device and a connection, the latter adapted for communication with a liquid-supply, of suitable valve provision, threaded tube coöperative with both said device and the connection, and a measuring-chamber comprising a base mounted on said tube and adjustable thereon for the purpose set forth, and a glass body on said base and provided with an elongated extension containing a vent-opening.

7. In means of the character described, the combination with a dispensing device and a connection, of valve provision and valve-seats controlling said device and the connection, a measuring-chamber in coöperative relation with the device and connection, and a plug coactive with one of said valve-seats for adjusting the same.

8. In means of the character described, the combination with a dispensing device and a connection, the latter adapted for communication with a liquid-supply, of valve provision coactive both with said device and with said connection for opening the one and closing the other, a measuring-chamber coöperative with said connection and dispensing device, a rear tubular seating for the valve provision and forwardly projecting relative to its supporting part.

9. In means of the character described, the combination with a dispensing device and a connection, the latter adapted for communication with a liquid-supply, of manually-operable valve provision coactive both with said device and said connection for opening the one and closing the other, and a liquid-measuring chamber coöperative with said connection and dispensing device, and vent-tube leading from the chamber, and means for changing the quantity of liquid to be delivered from said measuring-chamber, exclusive of said valve provision.

10. In means of the character described, the combination with a dispensing device and a connection, of valve provision and valve-seats controlling said device and the connection, a measuring-chamber in coöperative relation with the device and connection, and a plug coactive with one of said valve-seats for adjusting the same, said plug containing a passage adapted to maintain communication between the connection and measuring-chamber irrespective of the plug adjustment.

11. In means of the character described, the combination with a dispensing device, a connection adapted for communication with a liquid-supply, and an intermediate chamber, of manually-operable valve provision within said chamber and coactive both with said connection and dispensing device and normally closing the latter and opening the communication of the connection, a tube communicating with said chamber, a glass measuring-chamber adjustable on said tube and provided with an upper extension, and a guard for said measuring-chamber and extension and containing a sight-opening.

In testimony whereof I have signed my name to this specification in the presence of two subscribing witnesses.

GEORGE KISSAM COOKE.

Witnesses:
WILLIAM PAXTON,
H. E. MAHER.